(No Model.)
E. F. MURDOCK.
PNEUMATIC TIRE.
No. 551,088.  Patented Dec. 10, 1895.
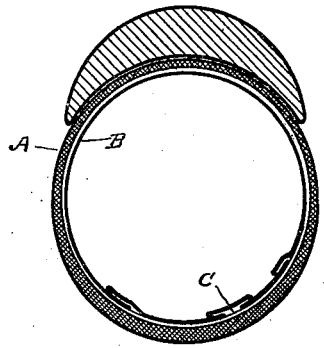
Fig. 1.
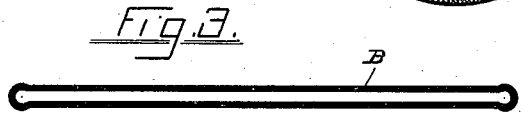
Fig. 3.
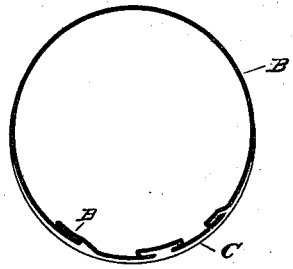
Fig. 2.
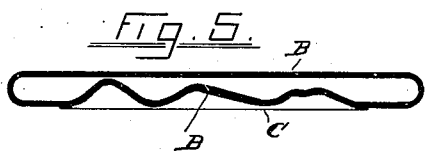
Fig. 4.
Fig. 5.
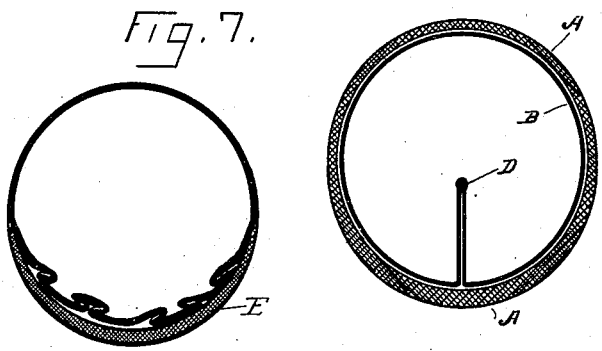
Fig. 7.  Fig. 6.
WITNESSES:
Baldwin Vale
Chas. J. Armbruster
INVENTOR
Edwin F. Murdock
BY
Boone & Murdock
ATTORNEY
ANDREW B.GRAHAM. PHOTO-LITHO. WASHINGTON, D.C.

UNITED STATES PATENT OFFICE.

EDWIN F. MURDOCK, OF OAKLAND, CALIFORNIA.

PNEUMATIC TIRE.

SPECIFICATION forming part of Letters Patent No. 551,088, dated December 10, 1895.

Application filed August 10, 1895. Serial No. 558,921. (No model.)

*To all whom it may concern:*

Be it known that I, EDWIN F. MURDOCK, a citizen of the United States, residing at Oakland, in the county of Alameda and State of California, have invented certain new and useful Improvements in Pneumatic Tires; and I do hereby declare the following to be a full, clear, and exact description of said invention, such as will enable others skilled in the art to which it most nearly appertains to make, use, and practice the same.

This invention relates to improvements in pneumatic tires for wheels, and more particularly to that class known as "double-tube tires."

The most prominent defect in pneumatic tires as a class has been their liability to puncture. Many devices have been produced with a view to overcoming this defect, in which there has generally been used some impervious material added to the construction of either the outer or inner tube. While a fair amount of success has been attained by various styles of this so-called armor, they have been objectionable as adding to the weight and expense of the tires and in rendering them stiff and hard. It is the object of this invention to overcome these objections.

The present invention consists in forming a tire in two tubes, the outer one non-expansible and of a desired diameter, while the inner one is of greater diameter than the outer, and further in providing means for compelling the accumulation of the excess material in the inner tubes to remain next the tread of the tire.

In the drawings, Figure 1 is a cross-section of a tire constructed in accordance with this invention. Fig. 2 is a cross-section of the inner tube distended. Fig. 3 is a detail view in cross-section of the rubber part of the inner tube collapsed. Fig. 4 is a detailed view in cross-section of the outer tube collapsed. Fig. 5 is a cross-section of the inner tube completely collapsed, and Fig. 6 is a view in cross-section of a tire constructed on an alternative plan for retaining the slack under the tread of the tire.

For the purpose of distinguishing the parts in refering to the drawings we will let A represent the outer tube; B, the inner tube; C, the non-expansible holding material for retaining the slack next the tread of the tire; and D, a fine spring-wire, which I sometimes use as an alternative for C.

The letter A represents an outer tube or casing of ordinary construction, adapted to receive an inner tube. This outer tube is non-expansible, being constructed of woven thread mixed with rubber. The tube B is drawn into it in the usual way. This inner tube is constructed of any suitable material—such as silk, rubber, or any flexible material—of larger diameter than the tube A, to permit the expansion of the tube A to its fullest extent without producing any lateral or stretching strain on itself when the air is pumped into it. To permit the introduction of the puncturing member into the outer tube or casing to a safe distance without exerting a circumferential strain on the inner tube B it is formed large enough to permit this, as is shown in Fig. 4 of the drawings. In this construction it will be observed that the inner tire will not be punctured by the introduced puncturing member, as long as there is no lateral strain, for the reason that the puncturing strain will be relieved by the flow of the material of the inner tube to take up the displacement. In practice I find that rubber will flow or unfold readily enough for practical purposes; but to improve this action I rub the outer surface well with some lubricant, such as ground pumice or soapstone. When now the folds of the tube lie on each other there is a fine coating of the lubricant between the folds, which insures a rapid reply to any strain exerted on the surface of the tube. The inside of the tube may be likewise treated if deemed advisable. As an alternative for this method of securing prompt action I sometimes cement to the outer face of the inner tube where it rests over the tread of the tire a thin strip of silk, which produces a smooth surface between the layers of the folds at this point.

To insure the folds of the inner tube coming over the tread of the tire, which is the part to be protected, I provide the non-expansible strip C, the edges of which are cemented or otherwise secured to the surface of the inner tube, as shown in the drawings at Fig. 3. The material is drawn into the slack form shown in the drawings, Fig. 5, between the cemented edges of the non-expansible strip C. In drawing the inner into the outer tube care should be taken that the non-expansible strip is laid next the tread of the outer tube. This insures the full excess or slack of the inner tube being in the position most desired or directly where the liability to puncture is greatest. I prefer to construct this retaining-strip of silk because of its lightness and toughness, which affords an additional protection to the inner tube. Any other fibrous material can, however, be substituted for silk. By thus using a fibrous material the point of the puncturing member is caught by the fibers and wrapped around it to form a ball or to fill in the spaces between the cutting points of the nail, tack, stone, splinter, or other puncturing device.

The combined inner tube and non-expansible material forms a tube having a diameter larger than the diameter of the outer tube A. This construction saves the inner tube from the strain between the tube and non-expansible material, and at the same time overcomes the liability to puncture to which it would be subjected were it stretched tightly.

The construction shown in Fig. 6 is an alternative to that shown in Figs. 1, 2, and 5. In this construction I use the wire D, which extends around the tire and is secured to the center of the inner tube. This wire compels the fullness of the material of the inner tube to extend outward toward the tread of the wheel, where it will be able to elude the puncturing thrust.

While I have described this improvement on the double-tube form of tire I do not confine myself to such construction, as the same may be applied to the single-tube wire, as is shown in Fig. 7 of the drawings. In this form the tube in its collapsed state is drawn together on the tread and a retaining-strip in the shape of a shoe E is securely cemented to the sides of the part thus drawn up. The operation of the slackened portion of this tire is the same as described above.

Having thus described this invention, what I claim is—

1. In a pneumatic tire the combination of an outer non-expansible casing, with an expansible tube contained within said casing and of greater diameter than said casing, and a non-expansible retaining strip attached to the said expansible tube to confine the excess material in said tube next the tread of the outer casing, substantially as described.

2. In a pneumatic tire, the combination of an expansible tube, a portion of which is contracted to form folds over the tread of the tire, and a non-expansible retaining strip or ribbon, the edges of which are secured to the said tube on either side of the contracted portion on the outside of the said tube, substantially as described, whereby the contracted portion is prevented from expanding when the tube is inflated.

3. In a pneumatic tire, the combination of an expansible tube, the material of which is contracted into folds over a portion of the tread of the tire, and a retaining strip or ribbon constructed of fibrous material, the edges of which are secured to the said tube on either side of the contracted portion on the outside of the said tube, substantially as described.

In testimony whereof I have hereunto set hand this 3d day of August, 1895.

EDWIN F. MURDOCK.

Witnesses:
BALDWIN VALE,
J. M. NOUGUES, Jr.